(12) United States Patent
Streit et al.

(10) Patent No.: US 12,321,719 B1
(45) Date of Patent: Jun. 3, 2025

(54) SYSTEM AND METHOD FOR PREPROCESSING AND CONDITIONING COSMIC RAY DATA FOR RANDOMNESS GENERATION

(71) Applicant: ENTROKEY LABS INC., Cheyenne, WY (US)

(72) Inventors: Scott Streit, Cheyenne, WY (US); David Harding, Cheyenne, WY (US); Matt Klepp, Cheyenne, WY (US); Richard Kane, Cheyenne, WY (US)

(73) Assignee: Entrokey Labs Inc., Cheyenne, WY (US)

( * ) Notice: Subject to any disclaimer, the term of this patent is extended or adjusted under 35 U.S.C. 154(b) by 0 days.

(21) Appl. No.: 18/991,130

(22) Filed: Dec. 20, 2024

(51) Int. Cl.
G06F 7/58 (2006.01)
G06N 3/045 (2023.01)
G06N 3/0475 (2023.01)
G06N 3/094 (2023.01)

(52) U.S. Cl.
CPC ............ *G06F 7/588* (2013.01); *G06N 3/045* (2023.01); *G06N 3/0475* (2023.01); *G06N 3/094* (2023.01)

(58) Field of Classification Search
CPC ........ G06F 7/588; G06N 3/045; G06N 3/075; G06N 3/094
See application file for complete search history.

(56) References Cited

U.S. PATENT DOCUMENTS

2018/0176576 A1* 6/2018 Rippel .................... G06N 3/08
2021/0049456 A1* 2/2021 Kursun ................. G06N 3/047

* cited by examiner

*Primary Examiner* — Michael D. Yaary
(74) *Attorney, Agent, or Firm* — Sheppard Mullin Richter & Hampton LLP (57) ABSTRACT

The present disclosure describes a method for conditioning and preprocessing raw cosmic ray data to extract features and generate a binary string representing the inherent randomness in the data. Measurable characteristics of cosmic ray particles, such as arrival times and amplitudes, are processed to create random binary sequences. These binary strings are then used to train a generative adversarial network (GAN) framework. In the GAN framework, the generator creates random sequences resembling the target distribution, which matches the entropy of the conditioned cosmic data. The discriminator evaluates the generated sequences by comparing them to the conditioned cosmic data and assigns a randomness score that characterizes the quality of the generated sequences. This adversarial process ensures the generation of high-quality random sequences that are statistically indistinguishable from the conditioned input data.

20 Claims, 4 Drawing Sheets

SYSTEM AND METHOD FOR PREPROCESSING AND CONDITIONING COSMIC RAY DATA FOR RANDOMNESS GENERATION

BACKGROUND

Randomness is a cornerstone of many fields because it introduces unpredictability and independence, which are essential for ensuring fairness, security, and accurate modeling of complex systems. Despite its importance, generating true randomness is difficult in deterministic systems like computers. Pseudorandom number generators (PRNGs) simulate randomness, but their deterministic nature limits their unpredictability. True randomness is achieved with hardware-based True Random Number Generators (TRNGs), which rely on physical processes to produce genuinely random numbers. However, hardware-based random number generators, while essential for true randomness, come with a range of challenges including to bias, speed, reliability issues, cost, and scalability, to name a few. Therefore, there is a need for solutions that mitigate these challenges while retaining randomness quality.

SUMMARY

The present disclosure provides systems and methods for preprocessing and conditioning raw cosmic ray data to extract features and generate binary strings representing the inherent randomness in the data to address shortcomings in randomness generation and evaluation. These binary strings are used to train a GAN (Generative Adversarial Network) to produce random sequences that are indistinguishable from the input conditioned cosmic data.

Various features and functionality can be provided for preprocessing, conditioning, and evaluating the randomness. In one aspect of the disclosure, a computer-implemented method may include receiving electrical signals generated in response to detecting cosmic ray data during one or more detection events. Each signal is associated with the detection of a single muon and characterized by parameters such as pulse amplitude (measured by an Analog-to-Digital Converter), signal amplitude (measured by a Silicon Photomultiplier), and timestamp data. Additionally, metadata such as sequential event identifiers, environmental temperature, and detector deadtime values may also be extracted.

The method may further require removing outlier values using statistical methods, such as the Theil-Sen estimator, Hodges-Lehmann estimator, and Modified Z-score method, to ensure data quality. Statistical filtering methods, such as percentile-based filtering, Z-score, and interquartile range techniques, are applied to compute the median for each parameter. Subsequently, the conditioned binary string is generated by assigning binary values to each preprocessed parameter, comparing them to their respective medians. In some embodiments, to enhance randomness, binary sequences corresponding to various parameters are combined using XOR (exclusive OR) operations.

The conditioned binary string is then fed into a GAN framework, comprising a generator and discriminator, for training. The generator is trained to produce random sequences mathematically similar to the conditioned binary string, while the discriminator evaluates the generated sequences by comparing them to the conditioned input data. The discriminator computes a randomness score that characterizes the quality of randomness in the generated sequence. This adversarial process iteratively refines the generator's output until it produces sequences indistinguishable from the conditioned cosmic data.

Implementations of the disclosed technology may include one or more of the following features. In one embodiment, the disclosed system provides a standalone randomness generator, derived from the trained generator of the GAN framework. This generator is capable of producing high-quality random sequences with entropy characteristics comparable to the conditioned cosmic ray data. The standalone generator ensures consistent, high-entropy output suitable for applications such as cryptography, secure communications, and simulations. By leveraging the robust source of entropy from cosmic ray data, the standalone generator offers a reliable solution for generating random sequences that are indistinguishable from true randomness.

Similarly, in another embodiment, the disclosed system enables the evaluation of randomness in any test random sequence in a standalone solution. For example, a trained discriminator, developed as part of the GAN framework, is applied to any test sequence to determine its randomness. The discriminator computes a randomness score that characterizes the quality of the test sequence, ensuring objective measurement of randomness. The discriminator itself is trained using the conditioned random binary sequence and mathematically similar random sequences generated by the GAN's generator. This process allows the discriminator to reliably distinguish test sequences and assess their randomness against a benchmark defined by the conditioned cosmic ray data. The standalone discriminator offers a powerful tool for validating randomness across multiple sources, including cryptographic keys, pseudorandom sequences, and other entropy-critical applications.

The disclosed method provides a robust solution for generating high-quality random sequences that can be used in applications such as cryptography, simulations, and secure communications. By leveraging cosmic ray data as a reliable entropy source, the system ensures the randomness of the generated sequences is statistically sound and objectively measurable.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Described herein are systems and methods for conditioning and preprocessing raw cosmic ray data to extract features and generate a binary string representing the inherent randomness in the data. The details of some example embodiments of the systems and methods of the present disclosure are set forth in the description below. Other features, objects, and advantages of the disclosure will be apparent to one of skill in the art upon examination of the following description, drawings, examples, and claims. It is intended that all such additional systems, methods, features, and advantages be included within this description, be within the scope of the present disclosure, and be protected by the accompanying claims.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As alluded to above, randomness ensures security, fairness, unpredictability, and the ability to model complex systems. While software-based mathematical algorithms like PRNGs are fast and cheap, the are deterministic and cannot generate truly random sequences. For example, Pseudorandom Number Generator (PRNG), each number in the sequence appears random but is not truly random. A PRNG starts with an initial seed, which is a fixed number or value.

By contrast, True Random Number Generator (TRNGs) generates numbers using inherently unpredictable physical processes, like radioactive decay, thermal noise, or cosmic events (e.g., muons randomly striking a detector at random). Each number is genuinely independent. For example, devices like quantum random number generators (QRNGs) may be used to detect phenomena such as the timing of photon emissions or the direction of particle spin. Similarly, TRNGs may produce true randomness by sampling thermal noise, or electrical noise in circuits (e.g., from resistors or semiconductors). Likewise, the decay of radioactive isotopes is unpredictable and can be measured to generate random numbers. Finally, leveraging cosmic rays or particles, such as muons, which strike detectors randomly, can be a random physical process. Each number generated by the TRNG process is genuinely independent of others; it cannot be predicted or reverse-engineered because they're not based on a deterministic algorithm. However, all TRNG applications require specialized hardware to harness physical phenomena making a software-only TRNG impossible. Additionally, the raw data often contains bias or patterns due to environmental factors or imperfections in measurement.

Often TRNGs are combined with PRNGs in a hybrid approach which provides the scalability of PRNGs with the unpredictability of TRNGs, making it suitable for applications like cryptography and secure communications. For example, TRNGs are often used to generate high-entropy seeds for PRNGs or supplement PRNGs periodically with new entropy. However, even a hybrid approach that uses high-entropy, unpredictable seeds may be vulnerable. Further still, the strong seed generated by TRNG relies on hardware randomness source, as alluded to earlier, making it costly.

The present system relies on preprocessing and conditioning of raw cosmic ray data comprising electrical signal associated with the pass-through of a single muon (u) to generate random binary strings. These binary strings are used to train GAN (Generative Adversarial Network) framework to produce random sequences that are indistinguishable from the input conditioned cosmic ray data. The unique combination of techniques and their application associated with preprocessing and conditioning of raw cosmic ray data ensures high entropy, robustness, and scalability.

For example, the system extracts and processes multiple physical parameters from cosmic ray detection (e.g., ADC amplitudes, SiPM signals, and event timestamps) rather than relying on a single source of randomness. These parameters capture distinct aspects of randomness, such as particle energy and timing, enhancing the overall entropy. By leveraging diverse randomness sources, the approach reduces dependency on any single parameter, increasing robustness against biases or hardware failures. Further, the approach combines advanced statistical methods, such as percentile-based filtering, Z-score methods, interquartile range (IQR), and robust estimators like the Theil-Sen and Hodges-Lehmann estimators, to ensure data quality. These methods go beyond traditional filtering by being resistant to extreme values and biases in the dataset. This ensures that the data retains inherent randomness while removing noise or artifacts that could compromise entropy. Additionally, the system uses the median as a robust threshold for converting continuous data into binary sequences. Unlike mean-based thresholds, the median is resistant to skewed distributions and outliers. This allows to preserve randomness while normalizing the dataset, making it suitable for downstream entropy enhancement techniques.

Furthermore, the system merges binary sequences derived from distinct physical measurements (ADC, SiPM, and time differences) using any number of low-level Boolean and binary operators. For example, exclusive OR (XOR) operator may be used to enhance entropy by blending independent randomness sources into a unified sequence, eliminating any residual patterns. This produces a final binary string with higher entropy and statistical randomness than individual sequences.

Compared to TRNGs, the present system avoids the costly specialized hardware and provides a software-only solution. Likewise, GAN-generated sequences have better statistical mimicry of natural randomness than PRNGs. As described in detail herein, the GAN framework can produce high-quality random sequences on demand, eliminating the need for direct access to cosmic ray data. This is achieved by integrating advanced statistical processing, entropy enhancement techniques, and AI-driven scalability. By addressing the challenges of bias, scalability, and robustness, this preprocessing and conditioning pipeline offers a highly reliable and flexible software-only solution for generating random binary sequences.

The disclosed system introduces several technical improvements, including enhanced scalability and adaptability versus conventional techniques of using seeds or dedicated hardware. It can handle new types of dataset or new data sources, without the need for retraining the entire model from scratch. Additionally, it can integrate new data sources and accommodate various business scenarios with minimal additional effort, providing a robust and versatile solution for domain-specific applications.

Figure 1:
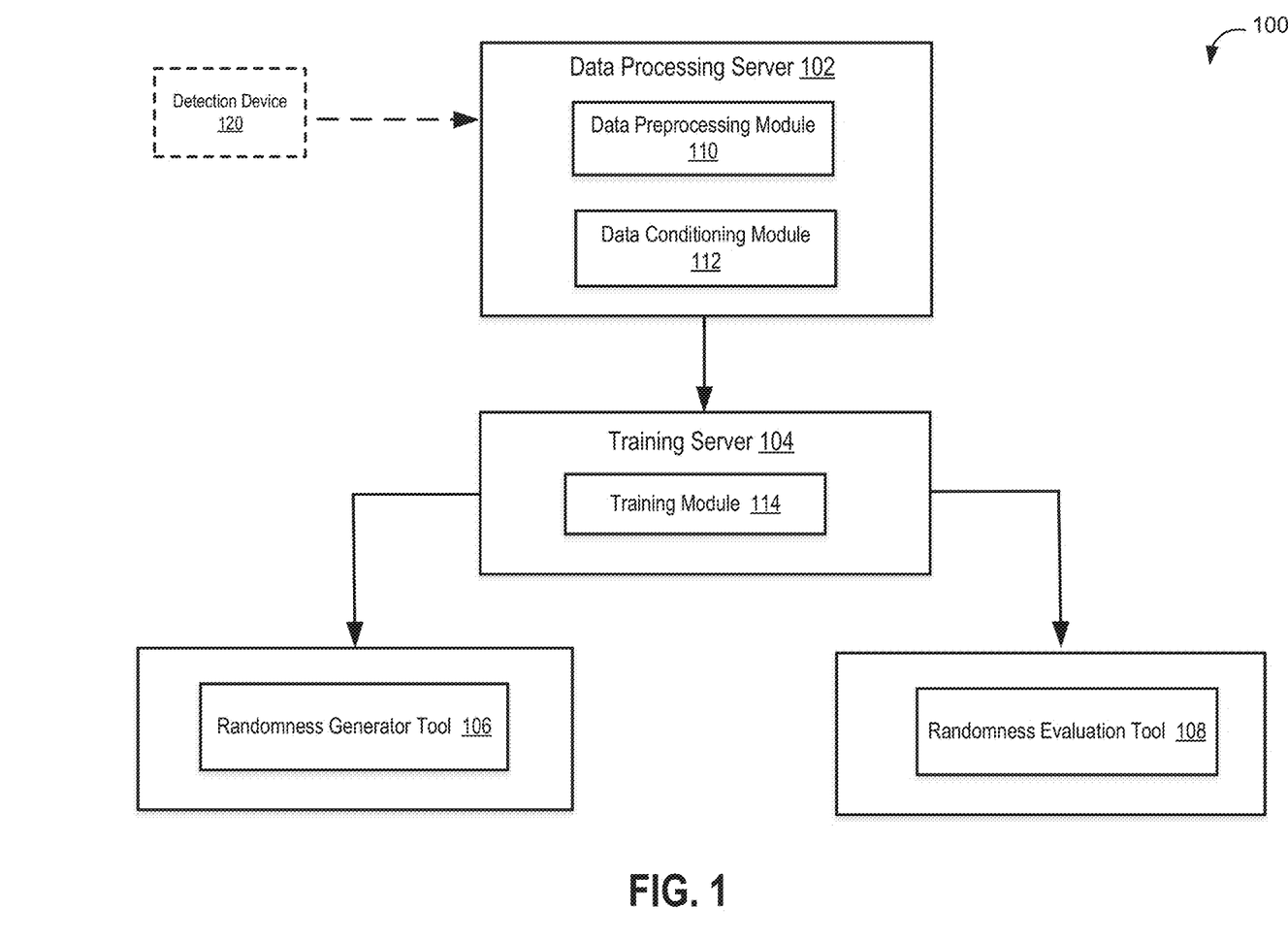
FIG. 1 depicts an exemplary system for preprocessing and conditioning raw cosmic ray data used in generating a random binary sequence, according to an implementation of the disclosure.

FIG. 1 illustrates an exemplary system for preprocessing and conditioning of raw cosmic ray data to extract features for training a generative adversarial network (GAN) to generate a binary string representing the inherent randomness which matches the entropy of the conditioned cosmic data, in accordance with the embodiments disclosed herein. System 100 may include a data processing server 102, a training server 104, a randomness generator tool 106, and a randomness evaluation tool 108. The data processing server 102 may include a data preprocessing module 110 and a data conditioning module 112, while a training server 104 may include a training module 114, respectively. In FIG. 1, although the system 100 is shown to include servers 102, 104, and tools 106, 108, the system 100 may include any number of servers and modules, without limiting the scope of the present disclosure.

The system 100 may be configured to receive raw data gathered by a specialized hardware device or component 120. In one embodiment, the specialized hardware device or component 120 may include a cosmic ray signal detection device. For example, the cosmic ray signal detection device may be a muon detection device that is sensitive to the pass-through of muons (e.g., Arduino Processor, Raspberry Pi using ARM processor and/or other devices). The muon detection device 120 may provide an electrical detection signal associated with the detection of a single muon μ during a cosmic radiation event. The muon is a fundamental particle with a negative electric charge and spin 1/2. The muon has a rest mass of 105.7 MeV/c$^2$, about two hundred seven times the electron mass, and has an average lifespan of 2.2 μs. The muon detection device 120 may comprise a material sensitive to the pass-through of muons such as, for example an organic or inorganic scintillator, a scintillator crystal, a semiconductor, a superconductor, or combinations thereof.

In some embodiments, the electrical signal generated by the muon detection device 120 may be processed by the data processing server 102, which includes the data preprocessing module 110 and the data conditioning module 112.

The resulting conditioned true random binary sequence are provided to the training server 104, which includes the training module 114. The training module 114 employs a Generative Adversarial Network (GAN) framework comprising a generator and a discriminator. Within this framework, the generator is trained to produce sequences indistinguishable from the true random sequences generated by the data processing server 102, while the discriminator evaluates the quality of these sequences. Once the GAN framework is trained, the generator is packaged as a stand-alone randomness generator tool 106 capable of generating high-quality random sequences. Similarly, the discriminator is packaged as a randomness evaluation tool 108, which is configured to evaluate the randomness of any input data by computing a randomness metric. Together, these tools 106 and 108 provide a comprehensive solution for the generation and validation of random sequences.

The components of system 100 may be communicatively coupled, for example, over a network (not illustrated), which may be a distributed network where the components of system 100 are located at physically different locations (e.g., on different racks, on different enclosures, in different buildings, in different cities, in different countries, and the like) while being connected via the network. In other examples, any combination of the components of system 100 may be co-located, including running as separate virtual devices on the same physical device.

Figure 2:
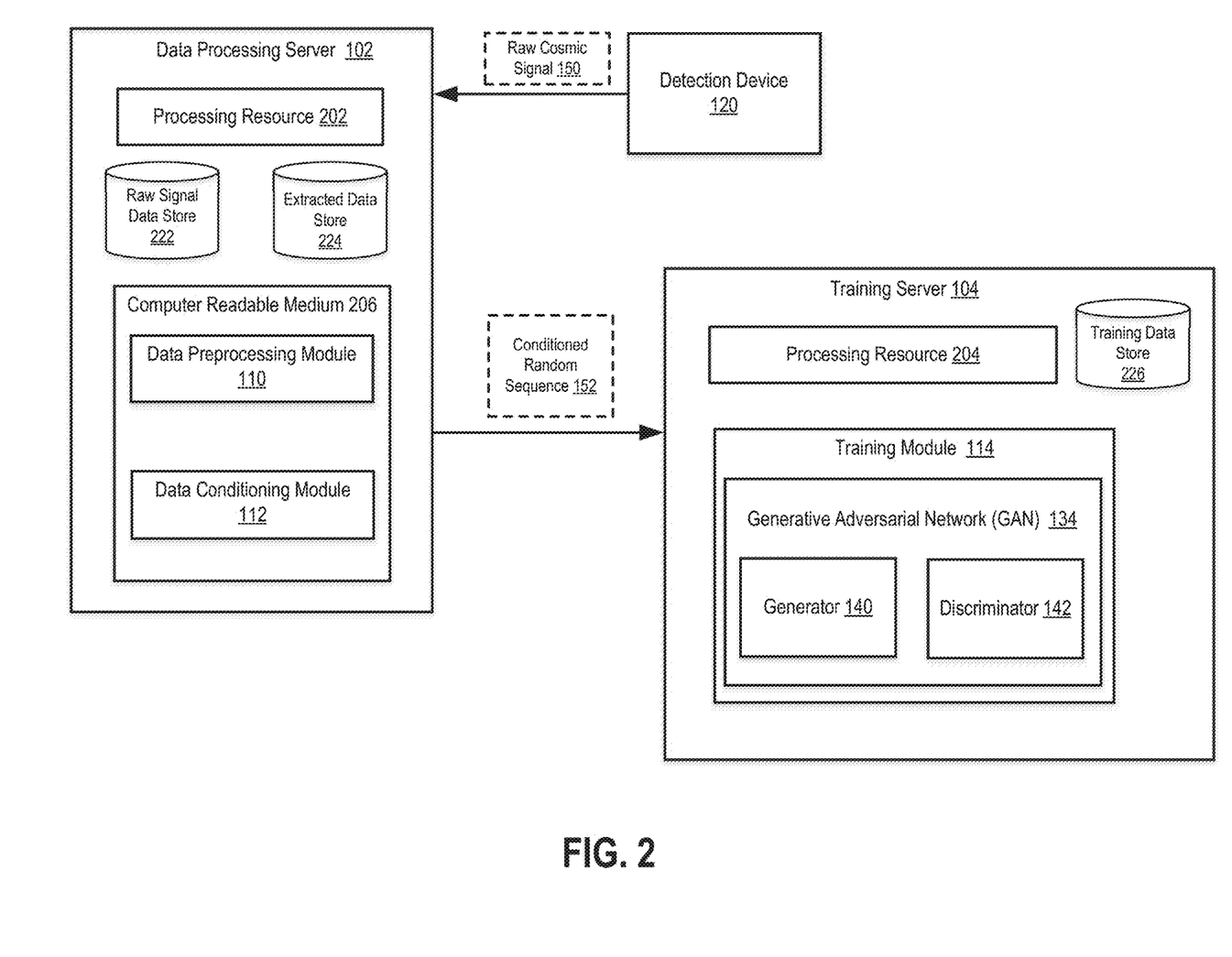
FIG. 2 illustrates detailed architecture of a data processing server and a training server in FIG. 1, according to an implementation of the disclosure.

In the example of FIG. 2, the data preprocessing module 110 and the data conditioning module 112 and the training server 104 are maintained on respective servers, specifically data processing server 102 and a training server 104, respectively.

As illustrated in FIG. 2, the data processing server 102 of FIG. 1 is a heterogeneous computing system including an example processing resource 202 and an example machine-readable medium 206. The processing resource 202 may include different types of processing units (also referred to as service provider resources), such as Central Processing Unit (CPU), Graphical Processing Unit (GPU), and the like. The machine-readable medium 206 includes memory resources (e.g., cache memory), storage resources (e.g., non-volatile storage devices), and the like. The machine readable medium 206 stores data processing module 110 and data conditioning module 112.

The components of data processing server 102 may be communicatively coupled to the detection device 120. For example, the data preprocessing module 110 may be configured to receive raw electrical signal generated by the detection device 120 in response to a muon detection event. The raw signal may be stored in a raw signal data store 222.

Next, the data preprocessing module 110 may be configured to perform a set of data preprocessing operations with the received raw electrical signal associated with the cosmic ray data. By virtue of performing data preprocessing ensures the raw data is clean and valid, laying the foundation for effective conditioning.

The data processing operations may include data extraction, data organization, outlier removal, and further preparation of data as input for data conditioning module 112, including time difference calculation, median encoding, and binary sequence generation.

The data preprocessing module 110 may extract relevant physical measurements or parameters from the raw input data frames generated by the cosmic ray detection device 120. In some embodiments, the extracted data may include an Analog-to-Digital Converter (ADC) value corresponding to pulse amplitude. The ADC is used to convert analog electrical signals generated by the detection of cosmic ray particles into digital values. The amplitude of the pulse indicates the energy deposited by the cosmic ray particle in the detector device 102.

Furthermore, the extracted data may include Silicon Photomultiplier (SiPM) signal amplitudes representing light intensities from scintillation. The SiPM is a highly sensitive light detector used to measure scintillation light (light emitted when a cosmic ray particle interacts with the detector material). The amplitude of the SiPM signal reflects the amount of light detected and, indirectly, the energy of the particle.

Finally, the extracted data may include a timestamp value providing precise timing information (i.e., timestamps) for each detected cosmic ray event. Each cosmic ray detection event is timestamped with high precision, typically in milliseconds or nanoseconds. The time of detection is critical for capturing the inherent randomness in the timing of cosmic ray events.

In some embodiments, the extracted data may include additional metadata values, such as environmental conditions (e.g., temperature, detector deadtime).

In some embodiments, these raw measurements may be bundled into data frames containing event identification values, timestamp, ADC amplitude, SiPM amplitude, and environmental metadata, (e.g., temperature, detector status). For example, the values of the 'ADC' column are extracted and stored in a variable adc_values=df['ADC'].tolist( ), the values of the 'SiPM' column are extracted and stored in a variable, SiPM_values=df['SiPM'].tolist( ) the values of the 'Ardn_time' column are extracted and stored in a variable time_values=df['Ardn_time'].tolist( ) the values of the Deadtimes column are extracted and stored in a variable, the values of the 'ADC' column are extracted and stored in a variable dead_times=df['Deadtime'].tolist( ).

Table 1 illustrates exemplary raw input collected by cosmic ray detection device 120 and received by the data processing server.

TABLE 1

| Comp Date | Comp Time | Event | Ardn Time | ADC [0-1023] | SiPM [mV] | Deadtime [ms] | Temp [C.] |
|---|---|---|---|---|---|---|---|
| 2024 Dec. 5 | 22:00:51.849410 | 1 | 1846 | 415 | 95.00 | 123 | 22.19 |
| 2024 Dec. 5 | 22:00:54.477156 | 2 | 4472 | 396 | 85.28 | 244 | 22.19 |
| 2024 Dec. 5 | 22:00:55.304517 | 3 | 5298 | 102 | 22.15 | 286 | 21.76 |
| 2024 Dec. 5 | 22:00:56.353356 | 4 | 6347 | 103 | 88.99 | 327 | 21.19 |
| 2024 Dec. 5 | 22:00:56.923819 | 5 | 6916 | 403 | 88.99 | 331 | 22.97 |
| 2024 Dec. 5 | 22:00:57.706204 | 6 | 7697 | 499 | 141.24 | 373 | 22.19 |
| 2024 Dec. 5 | 22:00:58.475014 | 7 | 8466 | 177 | 30.25 | 417 | 22.97 |

In some embodiments, the data preprocessing module 110 interfaces with hardware or file systems to process input data streams or logs. The data preprocessing module 110 parses and organizes the extracted data into structured formats for further processing. The extracted and processed cosmic data may be stored may be stored in an extracted data store 224.

As alluded to above, the extracted data may include event timestamp data for each detected cosmic ray event. In some embodiments, data preprocessing module 110 is configured to quantify the randomness in event timing by calculating the differences between consecutive timestamps of each event. For example, data preprocessing module 110 computes time differences between each pair of adjacent timestamps in the dataset. In some embodiments, the data preprocessing module 110 is configured to handle edge cases like missing or corrupted timestamps by using interpolation or rejecting incomplete data. The data preprocessing module 110 outputs a sequence of time intervals, which serves as a basis for encoding binary sequences.

In some embodiments, data preprocessing module 110 is configured to improve the quality of randomness by eliminating anomalous data points that could introduce bias or patterns. For example, raw data often contains noise, artifacts, or extreme values that can distort the randomness quality. Statistical filtering ensures data integrity by removing these anomalies. The data preprocessing module 110 cleans the dataset by ensuring only valid and consistent measurements are retained, improving the overall randomness quality. In some embodiments, the outliers are removed by applying at least one statistical method. For example, the data preprocessing module 110 may apply a percentile-based filtering, a Z-score method, a Interquartile Range (IQR) method, a Theil-Sen and Hodges-Lehmann estimators, and other such statistical methods to the extracted values.

For example, percentile-based filtering may be used to remove extreme values by discarding data below a certain percentile (e.g., 1%) and above another (e.g., 99%). Similarly, Z-score method may be used to calculate how many standard deviations a data point is from the mean. For example, outliers may be identified as points with Z-scores exceeding a particular threshold (e.g., ±3). Interquartile Range (IQR) method may be used to define outliers as points outside the range. In some embodiments, Theil-Sen and Hodges-Lehmann estimators may employ robust statistical methods that calculate the central tendency of the data while being resistant to outliers.

Once the data has been cleaned, as alluded to above, a robust threshold is established by calculating the central tendency of the extracted data. The data preprocessing module 110 is configured, for each type of data (ADC amplitudes, SiPM amplitudes, and time differences), to compute the median of the dataset. This step ensures the median computation is resistant to remaining noise or minor outliers.

For example, the following exemplary code may be used to filter out outliers and negative time differences:
  lower_bound=np.percentile (time_differences, 1.5)
  upper_bound=np.percentile (time_differences, 96)
  valid_time_differences=[td for td in time_differences if td>Lower_bound and td<(upper_bound)]
  average_time_difference=statistics.median (valid_time_differences)

In some embodiments, different methods for filtering outliers and calculating medians may also be applied to obtain optimum resistance to false data and improve entropy scoring. The same methods may be applied to other metadata including but not limited to: Analog Amplitudes, SiPMs, deadtimes, etc.

In some embodiments, the data preprocessing module 110 is configured to output medians for each dataset, which are transmitted to data conditioning module 112 for data conditioning steps, as provided in accordance with one or more embodiments of the present application.

As alluded to above, the data preprocessing module 110 transmits the preprocessed data to the data conditioning module 112. The data conditioning module 112 is configured to convert numerical values generated by the data preprocessing module 110 into binary sequences to ensure the binary encoding is efficient and captures the inherent randomness of the input data. The data conditioning module 112 converts numerical data points into binary sequences by comparing them to their respective medians and produces separate binary sequences for ADC values, SiPM amplitudes, and time differences. For example, if the numerical value is greater than the median, it is encoded as 1. Similarly, if the numerical value is less than or equal to the median, it is encoded as 0. This step ensures that the binary sequences reflect the relative distribution of the measurements, leveraging the randomness in cosmic ray data.

In some embodiments, data conditioning module 112 may apply an XOR operation to enhance the entropy and randomness of the binary sequence. For example, binary sequences from ADC amplitudes, SiPM amplitudes, and time differences are combined using the exclusive OR (XOR) operation. By XORing the binary sequences help merge multiple sources of randomness, eliminating patterns that might exist in individual sequences and increasing overall unpredictability. Furthermore, the XOR operation ensures the combined binary sequence is balanced (equal likelihood of 1's and 0's) and less susceptible to patterns. Upon completing the XOR operation, the data conditioning module 112 may be configured to output a single binary string representing randomness with higher entropy.

The training server 104 receives the conditioned random sequence 152 from the data conditioning module 112 of the data processing server 102. As illustrated in FIG. 2, the training server 104 comprises a processing resource 204, a training data store 226, and a training module 114. The training module 114 implements a Generative Adversarial Network (GAN) framework 134, which includes a generator 140 and a discriminator 142. The conditioned random sequence 152 serves as training input for the GAN framework, enabling it to generate high-quality random sequences that match the entropy and randomness of the input cosmic data.

Figure 3:
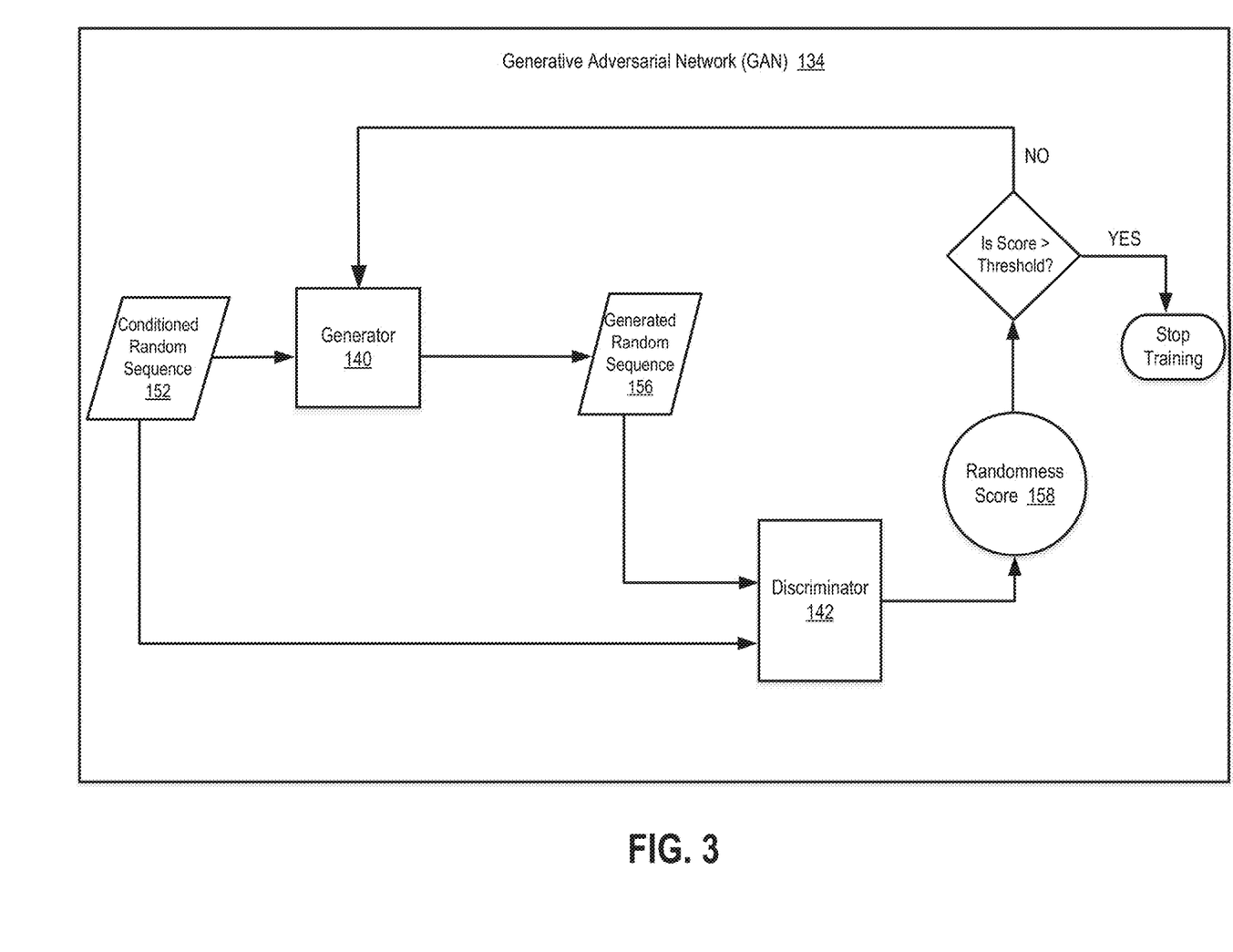
FIG. 3 illustrates an exemplary schematic diagram of a computer-based architecture of a generative adversarial network (GAN) framework of the system in FIG. 1 in greater detail, according to an implementation of the disclosure.

The GAN training process, depicted in FIG. 3, operates in an adversarial loop. The generator 140 creates synthetic random sequences 156 of binary values (1s and 0s) designed to resemble the statistical properties of the conditioned random sequence 152. Simultaneously, the discriminator 142 evaluates the generated sequences 156 by comparing them to the conditioned input data 152. The discriminator computes a randomness score 158, which serves as a feedback metric indicating the quality of randomness. If the randomness score 158 meets or exceeds a predefined threshold, the training process stops; otherwise, the generator 140 continues refining its output based on the feedback provided by the discriminator.

As alluded to above, the randomness score 158 is computed by the discriminator 142 within the GAN framework and serves as a measure of how closely the generated random sequences 156 match the statistical properties of the conditioned random sequence 152. For example, the discriminator 142 receives two inputs: the conditioned random sequence 142, which serves as the ground truth or target randomness, and the generated random sequence 156 produced by the generator. It then evaluates the randomness of the generated sequence using statistical metrics such as entropy, bit uniformity, and independence. Entropy measures the unpredictability of the sequence, while bit uniformity ensures an even distribution of 1's and 0's, and independence checks for the absence of patterns or correlations between consecutive bits.

Additionally, the discriminator 142 may apply established randomness test suites, such as the NIST Statistical Test Suite, to further validate the randomness of the generated sequence. Based on this evaluation, the discriminator computes a randomness score, typically represented as a numerical value between 0 and 1, where a score closer to 1 indicates a high level of randomness. The score is then compared against a predefined threshold to determine whether the generator's output meets the required quality. If the score exceeds the threshold, the training process halts, as the generator is deemed to have achieved sufficient quality of randomness. Conversely, if the score is below the threshold, the generator receives feedback to refine its output further, and the adversarial training loop continues. This iterative process ensures that the generator produces sequences that are statistically indistinguishable from the conditioned random data, achieving high-quality randomness suitable for various applications.

Upon completion of the training, the GAN framework outputs two standalone tools. The randomness generator tool 106, shown in FIG. 1, is derived from the trained generator 140 and is configured to produce high-quality random sequences with entropy characteristics comparable to the conditioned cosmic ray data. These sequences are suitable for applications requiring secure, unpredictable randomness, such as cryptography or simulations. Additionally, the randomness evaluation tool 108, also illustrated in FIG. 1, is derived from the trained discriminator 142. This tool is configured to objectively assess the quality of randomness in any input data by computing a randomness metric. The randomness evaluation tool 108 can compare multiple randomness sources, including true and pseudorandom sequences, to evaluate their entropy and overall quality.

Figure 4:
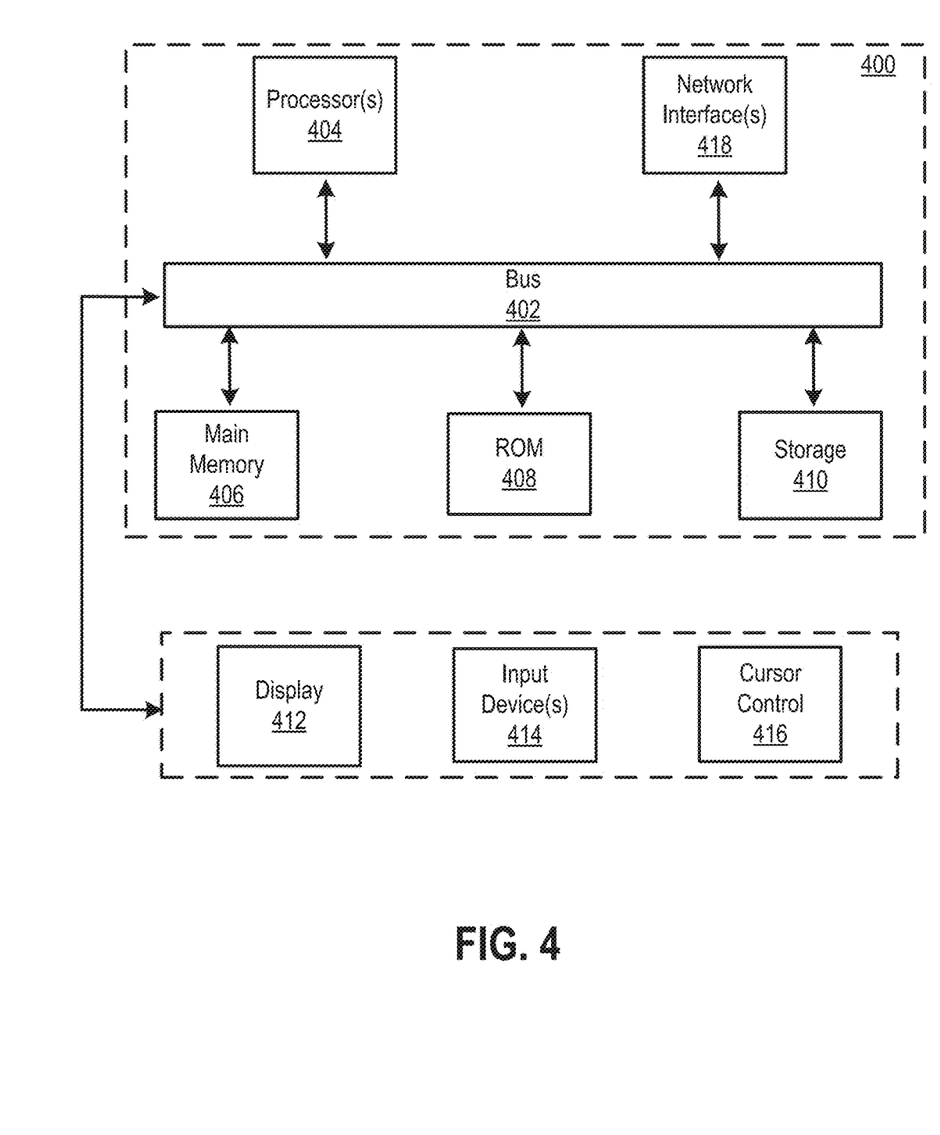
FIG. 4 illustrates an example computing system that may be used in implementing various features of embodiments of the disclosed technology.

By virtue of the randomness generator tool 106 and the randomness evaluation tool 108 produced through its GAN framework, the system 100 provides a comprehensive solution for the generation and validation of high-quality random sequences. The integration of the conditioned cosmic ray data ensures that both tools leverage a robust source of entropy, delivering reliable and statistically sound results.

Where components, logical circuits, or engines of the technology are implemented in whole or in part using software, in one embodiment, these software elements can be implemented to operate with a computing or logical circuit capable of carrying out the functionality described with respect thereto. One such example computing module is shown in FIG. 4. Various embodiments are described in terms of this example computing module 400. After reading this description, it will become apparent to a person skilled in the relevant art how to implement the technology using other logical circuits or architectures.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAS, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Referring now to FIG. 4, any suitable computing module or system or group of computing modules or systems can be used for performing the operations described herein. For example, FIG. 4 depicts an example of a computing module 400 that can be used as a data processing server 102, a training server 104, a randomness generator tool 106, a randomness evaluation tool 108, or various other computing devices performing operations described herein.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally. The bus 402 may also be connected to other components such as a display 412, input devices 414, or cursor control 416 to help facilitate interaction and communications between the processor and/or other components of the computing module 400.

Computing module 400 might also include one or more memory modules, simply referred to herein as main memory 406. For example, preferably random-access memory (RAM) or other dynamic memory might be used for storing information and instructions to be executed by processor 404. Main memory 406 might also be used for storing temporary variables or other intermediate information during execution of instructions to be executed by processor 404. Computing module 400 might likewise include a read only memory ("ROM") 408 or other static storage device 410 coupled to bus 402 for storing static information and instructions for processor 404.

Computing module 400 might also include one or more various forms of information storage devices 410, which might include, for example, a media drive and a storage unit interface. The media drive might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to, or accessed by media drive. As these examples illustrate, the storage media can include a computer usable storage medium having stored therein computer software or data.

In alternative embodiments, information storage devices 410 might include other similar instrumentalities for allowing computer programs or other instructions or data to be loaded into computing module 400. Such instrumentalities might include, for example, a fixed or removable storage unit and a storage unit interface. Examples of such storage units and storage unit interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module 400.

Computing module 400 might also include a communications interface or network interface(s) 418. Communications or network interface(s) interface 418 might be used to allow software and data to be transferred between computing module 400 and external devices. Examples of communications interface or network interface(s) 418 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications or network interface(s) 418 might typically be carried on signals, which can be electronic, electromagnetic (which includes optical) or other signals capable of being exchanged by a given communications interface. These signals might be provided to communications interface 418 via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 406, ROM 408, and storage unit interface 410. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for preprocessing and conditioning raw cosmic ray data to generate a binary sequence representing randomness, the method comprising:
   receiving a plurality of electrical signals generated in response to detecting raw cosmic ray data captured during at least one cosmic ray detection event;
   extracting a set of values associated with each electrical signal, each set comprising at least one of a pulse amplitude value, a signal amplitude value, and a timestamp value;
   preprocessing each value within the extracted set;
   conditioning each of the preprocessed values to generate a random binary sequence; and
   feeding the conditioned random binary sequence to train a generator of a neural network to generate a random sequence mathematically similar to the conditioned random binary sequence; and
   feeding the generated random sequence to train a discriminator of the neural network to distinguish the generated random binary sequence from the conditioned random binary sequence;
   wherein the discriminator assigns a score to the generated random sequence characterizing randomness of the generated random binary sequence.

2. The computer-implemented method of claim 1, wherein each electrical signal is associated with detection of a single muon ($\mu$).

3. The computer-implemented method of claim 1, wherein the at least one cosmic ray detection events is characterized by a sequential event identifier.

4. The computer-implemented method of claim 1, wherein the pulse amplitude value is measured by an Analog-to-Digital Converter (ADC) and represent energy deposited by a cosmic ray particle.

5. The computer-implemented method of claim 1, wherein the signal amplitude value is measured by a Silicon Photomultiplier (SiPM) and represent energy deposited by a cosmic particle.

6. The computer-implemented method of claim 1, wherein preprocessing each value comprises determining a time of detection difference between consecutive timestamps of consecutive cosmic ray events.

7. The computer-implemented method of claim 6, wherein the timestamp associated with each cosmic ray detection event is expressed in milliseconds and represents a time of detection of the cosmic ray detection event.

8. The computer-implemented method of claim 1, wherein preprocessing each value comprises:
   removing outlier values from each value within the extracted set by applying at least one of a Theil-Sen estimator, a Hodges-Lehmann estimator, and a Modified Z-score method to each value within the extracted set; and
   computing a median for each of value within the extracted set using at least one statistical filtering method.

9. The computer-implemented method of claim 8, wherein the at least one statistical filtering method comprises a percentile-based filtering, Z-score method, and an interquartile range method.

10. The computer-implemented method of claim 8, wherein conditioning each of the preprocessed values comprises assigning a binary sequence to each value by comparing each value to its respective median.

11. The computer-implemented method of claim 10, wherein the binary sequences for each value of the set are combined using XOR (exclusive OR) operations.

12. The computer-implemented method of claim 1, wherein each set of values comprises detector metadata, the detector metadata comprising a deadtime value and an environmental temperature value.

13. The computer-implemented method of claim 1, wherein the neural network comprises a generative adversarial network (GAN).

14. A system for generating random sequence representing randomness, the system comprising:
   a generative adversarial network (GAN) comprising:
      a generative neural network configured to generate an estimated random binary sequence based on a received training random binary sequence, and
      a discriminative neural network configured to compare the estimated random binary sequence and the received training random binary sequence;
   wherein the received training binary sequence comprises data associated with raw cosmic ray data captured during at least one cosmic ray detection event.

15. The system of claim 14, wherein capturing the raw cosmic ray data comprises receiving a plurality of electrical signals generated in response to detecting raw cosmic ray data captured during at least one cosmic ray detection event.

16. The system of claim 15, wherein the received training binary sequence is generated by:
   extracting a set of values associated with each electrical signal, each set comprising at least one of a pulse amplitude value, a signal amplitude value, and a timestamp value;
   preprocessing each value within the extracted set; and
   conditioning each of the preprocessed value to generate a random binary sequence.

17. The system of claim 15, wherein preprocessing each value comprises:
   removing outlier values from each value within the extracted set by applying at least one of a Theil-Sen estimator, a Hodges-Lehmann estimator, and a Modified Z-score method to each value within the extracted set; and
   computing a median for each of value within the extracted set using at least one statistical filtering method;

wherein the at least one statistical filtering method comprises a percentile-based filtering, Z-score method, and an interquartile range method.

18. The system of claim 17, wherein conditioning each of the preprocessed values comprises:
   assigning a binary sequence to each value by comparing each value to its respective median; and
   combining the assigned binary sequences for each value of the set using XOR (exclusive OR) operations.

19. A computer-implemented method for preprocessing and conditioning raw cosmic ray data to generate a random sequence representing randomness, the method comprising:
   feeding a training random binary sequence to train a generator of a first neural network to generate a random sequence mathematically similar to the training random binary sequence; and
   feeding the mathematically similar random sequence generated by the generator to train a discriminator of a second neural network to distinguish it from the training random binary sequence;
   wherein the random binary sequence comprises data associated with cosmic ray data captured during at least one cosmic ray detection event.

20. A computer-implemented method for preprocessing and conditioning raw cosmic ray data to generate a binary string representing randomness, the method comprising:
   receiving a test random sequence;
   determining randomness of the test random sequence by applying a trained discriminator associated with a generative adversarial network (GAN); and
   generating a randomness score characterizing the randomness of the test random sequence;
   wherein the trained generator associated with the GAN is trained by:
      receiving a conditioned random binary sequence to train a generator of the GAN to generate a random sequence mathematically similar to the conditioned random binary sequence; and
      receiving the mathematically similar random sequence generated by the generator to train the discriminator of the GAN to distinguish it from the training conditioned random binary sequence;
   wherein the discriminator assigns a score to the mathematically similar random sequence generated by the generator, wherein the score characterizes randomness of the mathematically similar random sequence.

* * * * *